United States Patent
Takeuchi et al.

(10) Patent No.: US 8,139,342 B2
(45) Date of Patent: Mar. 20, 2012

(54) LAMINATED ELECTRONIC COMPONENT AND METHOD FOR MANUFACTURING THE SAME

(75) Inventors: Shunsuke Takeuchi, Echizen (JP); Kenichi Kawasaki, Echizen (JP); Akihiro Motoki, Fukui (JP); Makoto Ogawa, Fukui (JP); Toshiyuki Iwanaga, Sabae (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 356 days.

(21) Appl. No.: 12/466,393

(22) Filed: May 15, 2009

(65) Prior Publication Data

US 2009/0290280 A1    Nov. 26, 2009

(30) Foreign Application Priority Data

May 21, 2008   (JP) ................. 2008-132870

(51) Int. Cl.
*H01G 4/228* (2006.01)
(52) U.S. Cl. ................... 361/306.3; 361/309
(58) Field of Classification Search .......... 361/303, 361/306.1, 306.3, 309
See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 2005/0046536 A1 | 3/2005 | Ritter et al. | |
| 2007/0014075 A1 | 1/2007 | Ritter et al. | |
| 2008/0118721 A1 | 5/2008 | Horie et al. | |
| 2008/0123248 A1 | 5/2008 | Kunishi et al. | |
| 2008/0123249 A1 | 5/2008 | Kunishi et al. | |
| 2008/0145551 A1 | 6/2008 | Kunishi et al. | |
| 2008/0151470 A1 | 6/2008 | Motoki et al. | |

(Continued)

FOREIGN PATENT DOCUMENTS

WO    2007/007677 A1    1/2007

(Continued)

OTHER PUBLICATIONS

Kayatani et al.; "Multilayer Ceramic Electronic Component and Method for Making the Same"; U.S. Appl. No. 12/469,799, filed May 21, 2009.
Kawasaki et al.; "Laminated Electronic Component and Method for Manufacturing the Same"; U.S. Appl. No. 12/466,435, filed May 15, 2009.

(Continued)

*Primary Examiner* — Eric Thomas
(74) *Attorney, Agent, or Firm* — Keating & Bennett, LLP

(57) ABSTRACT

A laminated electronic component is configured to include substrate plating films disposed on outer surfaces of an electronic component main body through direct plating such that external terminal electrodes are connected to exposed portions of internal conductors (internal electrodes), and the average particle diameter of metal particles defining the substrate plating film is at least about 1.0 µm. The external terminal electrode includes at least one layer of an upper plating film disposed on the substrate plating film. The metal particles defining the substrate plating film are Cu particles.

2 Claims, 9 Drawing Sheets

U.S. PATENT DOCUMENTS

| | | |
|---|---|---|
| 2008/0158774 A1 | 7/2008 | Trinh |
| 2008/0210564 A1 | 9/2008 | Motoki et al. |
| 2008/0225462 A1 | 9/2008 | Motoki et al. |
| 2008/0239617 A1 | 10/2008 | Motoki et al. |
| 2009/0052114 A1 | 2/2009 | Motoki et al. |

FOREIGN PATENT DOCUMENTS

| | | |
|---|---|---|
| WO | WO 2007007677 A1 * | 1/2007 |
| WO | 2007/049456 A1 | 5/2007 |
| WO | 2008/023496 A1 | 2/2008 |

OTHER PUBLICATIONS

Official Communication issued in corresponding Chinese Patent Application No. 200910138976.4, mailed on Aug. 23, 2010.

Ogawa et al., "Laminated Electronic Component", U.S. Appl. No. 12/943,072, filed Nov. 10, 2010.

Official Communication issued in corresponding Chinese Patent Application No. 200910138976.4, mailed on Jul. 26, 2011.

* cited by examiner

LAMINATED ELECTRONIC COMPONENT AND METHOD FOR MANUFACTURING THE SAME

BACKGROUND OF THE INVENTION

1. Field of the Invention

The present invention relates to a laminated electronic component and a method for manufacturing the same. In particular, the present invention relates to a laminated electronic component in which external terminal electrodes connected to internal conductors are formed on outer surfaces of an electronic component main body through a direct plating step and a method for manufacturing the same.

2. Description of the Related Art

In recent years, the market for small portable electronic equipment, e.g., cellular phones, notebook personal computers, digital cameras, and digital audio equipment, has been increasing. In the portable electronic equipment, miniaturization has been advanced which, at the same time, performance has been improved. A plurality of laminated electronic components are mounted on the portable electronic equipment, and miniaturization and performance enhancement of these laminated electronic components have also been required. For example, miniaturization and an increase in capacity are required for laminated ceramic capacitors.

To achieve the miniaturization and increase the capacity of the laminated ceramic capacitor, it is useful to reduce the thickness of a ceramic layer. Recently, a capacitor in which the thickness of ceramic layer is about 3 μm or less has been used. At present, further reductions in thickness are required. However, there is a problem in that as the thickness of the ceramic layer is reduced, short-circuiting between internal electrodes readily occurs and, thereby, it is difficult to ensure quality.

It is also effective to increase an effective area of the internal electrode. However, in mass production of the laminated ceramic capacitor, it is necessary to provide a side margin between an internal electrode and a side surface of a ceramic element assembly and an end margin between the internal electrode and the end surface of the ceramic element assembly due to deviations in lamination and deviations in cutting of the ceramic green sheets. Therefore, when an increase in the effective area of the internal electrode is desired, it is necessary that the area of the ceramic layer is increased in order to provide a predetermined margin. However, there is a limit to the amount of increase in the area of the ceramic layer within the bounds of a dimensional standard of the product. Furthermore, the thickness of the external terminal electrode prevent an increase in the area of the ceramic layer.

Previously, the external terminal electrode of the laminated ceramic capacitor is formed by applying an electrically conductive paste to an end portion of a ceramic element assembly and baking the ceramic element assembly. As the method for applying the electrically conductive paste, a method in which the end portion of the ceramic element assembly is immersed in a paste bath and is removed therefrom is conventionally used. However, in this method, the electrically conductive paste tends to predominantly adhere to a center portion of the end surface of the ceramic element assembly due to the influence of the viscosity of the electrically conductive paste. Consequently, the external terminal electrode becomes thick at portions thereof (specifically, greater than 30 μm, for example), and the area of the ceramic layer has to be reduced accordingly.

Under the circumstances, a method has been proposed in which an external terminal electrode is formed by direct plating. According to this method, a plating film is deposited while an exposed portion of an internal electrode exposed at an end surface of a ceramic element assembly functions as a seed, and exposed portions of adjacent internal electrodes are connected to each other through growth of the plating film. According to this method, a thin, flat electrode film can be formed as compared to that formed by using the electrically conductive paste according to a method of the related art (see, for example, International Patent Publication WO 2007/049456).

However, when the external terminal electrode is formed through direct plating on an outer surface of the electronic component main body (ceramic element assembly), since the thickness of the plating film is relatively small, an intrusion path of moisture and other contaminants from the outside becomes short and, thereby, there is a problem in that the reliability in moisture-resistance at high temperatures is deteriorated.

SUMMARY OF THE INVENTION

To overcome the problems described above, preferred embodiments of the present invention provide a laminated electronic component including external terminal electrodes formed on outer surfaces of an electronic component main body by direct plating and which has outstanding moisture resistance and a method for manufacturing the same.

A laminated electronic component according to a preferred embodiment of the present invention includes an electronic component main body including a plurality of laminated functional layers, internal conductors which are disposed inside the electronic component main body and which have exposed portions exposed at outer surfaces of the electronic component main body, and external terminal electrodes disposed on the outer surfaces of the electronic component main body so as to connect the internal conductors and cover the exposed portions of the internal conductors, wherein the external terminal electrode includes a substrate plating film disposed on the outer surface of the electronic component main body by direct plating so as to cover the exposed portions of the internal conductors, and the average particle diameter of metal particles defining the substrate plating film is at least about 1.0 μm.

Preferably, the external terminal electrode further includes at least one upper plating film layer disposed on the substrate plating film.

Preferably, the metal particles defining the substrate plating film are Cu particles.

A method for manufacturing a laminated electronic component including an electronic component main body including a plurality of laminated functional layers, internal conductors which are disposed inside the electronic component main body and a portion of which are exposed portions exposed at outer surfaces of the electronic component main body, and external terminal electrodes disposed on the outer surfaces of the electronic component main body so as to connect to the internal conductors and cover the exposed portions of the internal conductors, according to a preferred embodiment of the present invention, includes the step of forming a substrate plating film having an average particle diameter of metal particles of at least about 1.0 μm on the outer surface of the electronic component main body through direct plating so as to cover the exposed portions of the internal conductors in the formation of the external terminal electrodes on the electronic component main body.

Preferably, in the laminated electronic component including the electronic component main body in which the plurality of functional layers are laminated, the internal conductors which are disposed in the inside of the electronic component main body and a portion of which are exposed portions exposed at the outer surfaces of the electronic component main body, and the external terminal electrodes disposed so as to connect to the internal conductors and cover the exposed portions of the internal conductors, the external terminal electrode includes the substrate plating film disposed on the outer surface of the electronic component main body through direct plating so as to cover the exposed portions of the internal conductors, and the average particle diameter of metal particles defining the substrate plating film is at least about 1.0 μm. Consequently, moisture intrusion paths are reduced and the intrusion of moisture from the outside is prevented. As a result, moisture resistance of the laminated electronic component can be greatly improved. That is, moisture intrusion paths formed at grain boundaries are reduced by specifying the average particle diameter of metal particles to be at least about 1.0 μm and, thereby, the moisture resistance can be improved as compared to a case in which the average particle diameter is less than about 1.0 μm.

The substrate plating film can be formed by a method in which the surface of the electronic component main body is subjected to strike plating and, thereafter, a plating film having an average particle diameter of metal particles of at least about 1.0 μm is formed, a method in which a strike plating film having an average particle diameter of metal particles of at least about 1.0 μm is formed on the surface of the electronic component main body and the strike plating film defines a substrate plating film on an as-is basis, or a method in which the surface of the electronic component main body is subjected to a pretreatment and, thereafter, a plating film is directly formed such that the average particle diameter of metal particles is at least about 1.0 μm. However, the method for forming the substrate plating film is not specifically limited.

Furthermore, when at least one layer of upper plating film is disposed on the substrate plating film, the external terminal electrode can be provided with preferable characteristics in addition to the moisture resistance by appropriately selecting the type of the upper plating film and combining the upper plating film with the substrate plating film, such that a laminated electronic component having further improved characteristics can be obtained.

For example, a Cu plating film having an average particle diameter of metal particles of at least about 1.0 μm is formed as the substrate plating film, a Ni plating film is formed thereon, a Sn plating film is further formed on the Ni plating film and, thereby, a laminated electronic component provided with external electrodes having outstanding characteristics can be obtained, wherein the substrate plating film performs a moisture-resisting function, the Ni plating film performs a solder-barrier function, and Sn plating film performs a function of ensuring wettability.

Usually, as the material for a plating film defining an outermost layer of the upper plating film, an appropriate metal material is selected in accordance with a mounting arrangement. For example, when the laminated electronic component is mounted using soldering, Sn may preferably be used, when the laminated electronic component is mounted using wire bonding, Au may preferably be used, and when the laminated electronic component is embedded in a substrate, Cu may preferably be used.

In various preferred embodiments of the present invention, it is preferable that the metal particles defining the substrate plating film are Cu particles, for example. This is because, for example, the film formability is improved (stretchable), the oxidation resistance is excellent, the bondability of the internal electrode is good (in particular, diffusibility with Ni is good), and the density is relatively high (recrystallization temperature is low).

In the method for manufacturing a laminated electronic component according to various preferred embodiments of the present invention, the substrate plating film having an average particle diameter of metal particles of at least about 1.0 μm is formed by direct plating on the outer surface of the electronic component main body so as to cover the exposed portions of the internal conductors during the formation of the external terminal electrodes on the electronic component main body. Consequently, moisture intrusion paths formed at grain boundaries are reduced and, thereby, the intrusion of moisture is suppressed. As a result, the reliability in moisture resistance of the laminated electronic component can be greatly improved.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

The features of the present invention will be described below in further detail with reference to preferred embodiments of the present invention.

First Preferred Embodiment

In the first preferred embodiment of the present invention, a two-terminal type laminated ceramic capacitor including a pair of external terminal electrodes defined by one Cu plating film layer will be described as an example of a laminated electronic component.

Figure 1:
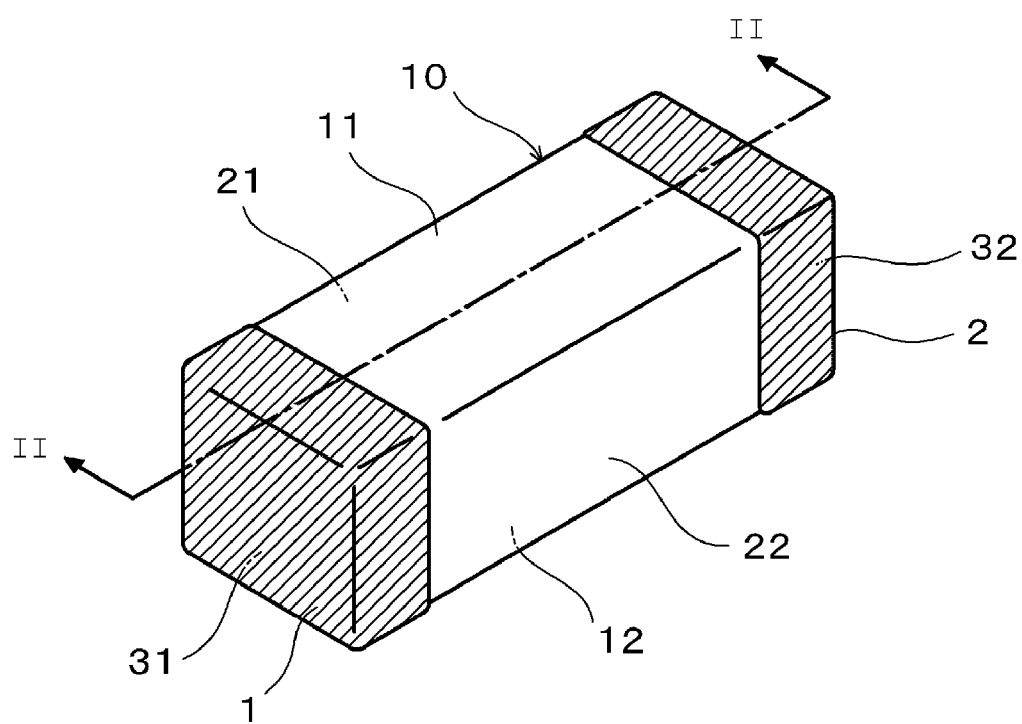
FIG. 1 is a perspective view showing an external configuration of a laminated electronic component according to a first preferred embodiment of the present invention.
Figure 2:
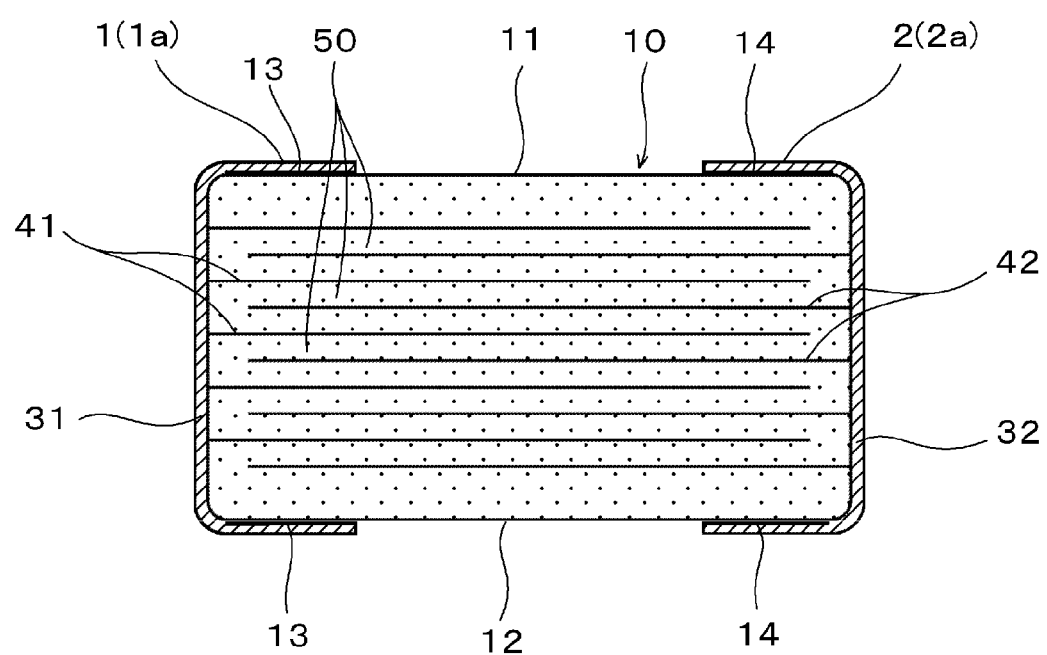
FIG. 2 is a sectional view of a section taken along a line II-II shown in FIG. 1.
Figure 3:
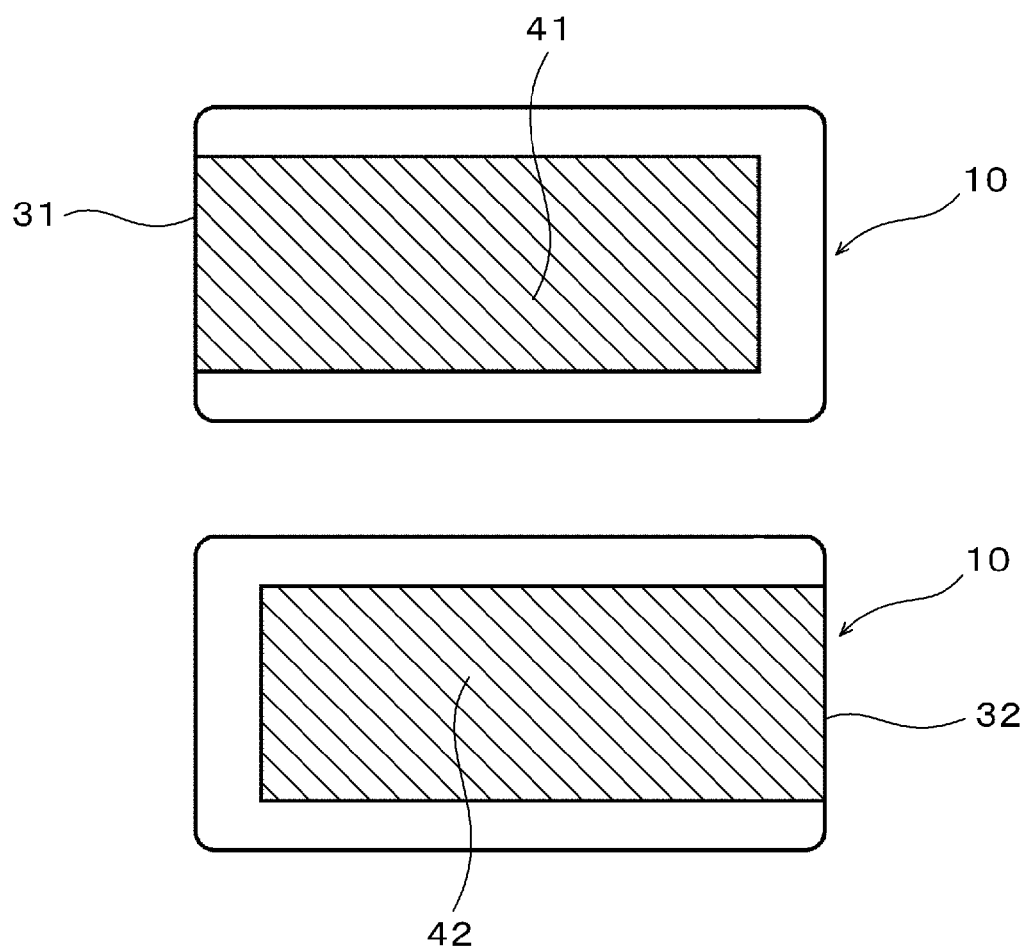
FIG. 3 is a diagram showing internal electrode patterns of the laminated ceramic capacitor according to the first preferred embodiment of the present invention.
Figure 4:
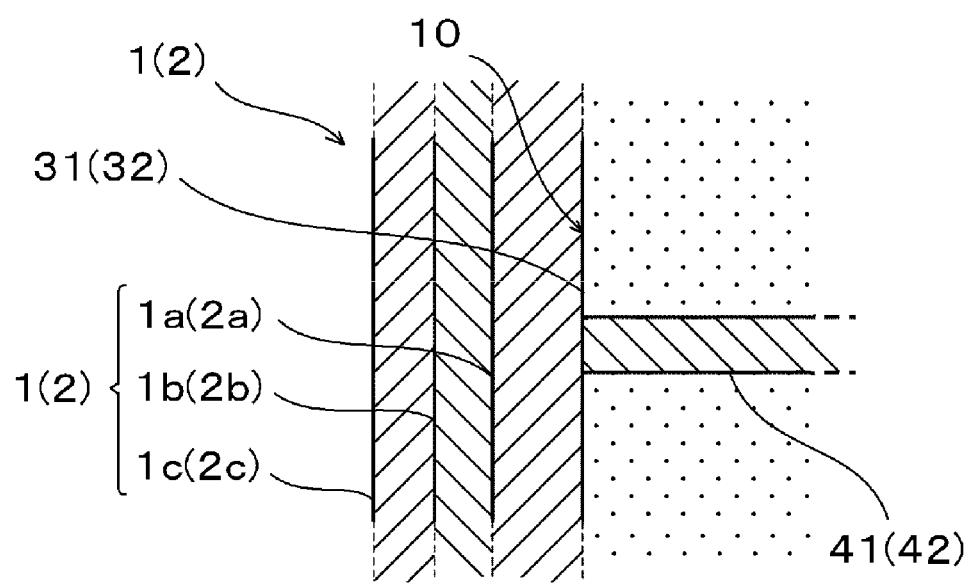
FIG. 4 is a diagram showing a magnified portion of the laminated ceramic capacitor according to the first preferred embodiment of the present invention.

FIG. 1 is a perspective view showing an external configuration of a laminated ceramic capacitor according to the first preferred embodiment of the present invention. FIG. 2 is a sectional view of a section taken along a line II-II shown in FIG. 1. FIG. 3 is a diagram showing internal electrode patterns of this laminated ceramic capacitor. FIG. 4 is a diagram showing a magnified portion, e.g., a connection portion between an external terminal electrode and an internal electrode.

The laminated ceramic capacitor includes a capacitor main body 10 in the shape of a substantially rectangular parallelepiped having a first principal surface 11 and a second principal surface 12 that are opposite to each other, a first side surface 21 and a second side surface 22 that are opposite to each other, and a first end surface 31 and a second end surface 32 that are opposite to each other. The capacitor main body 10 includes a plurality of laminated dielectric layers 50.

A first external terminal electrode 1 is disposed on the first end surface 31, and a second external terminal electrode 2 is disposed on a second end surface 32. The first external terminal electrode 1 and the second external terminal electrode 2 are electrically insulated from each other.

First surface conductors 13 and second surface conductors 14 are disposed on the first principal surface 11 and the second principal surface 12, respectively. The first surface conductors 13 are arranged at folded portions of the first external terminal electrode 1, and the second surface conductors 14 are arranged at folded portions of the second external terminal electrode 2. The first and the second surface conductors 13 and 14 may also be provided on the first side surface 21 and the second side surface 22. When the folded portions of the first and the second external terminal electrodes 1 and 2 are not required to be relatively long, the first and the second surface conductors 13 and 14 need not be provided.

As shown in FIG. 2, first internal electrodes 41 and second internal electrodes 42 are arranged to face each other with dielectric layers 50 disposed therebetween inside the capacitor main body 10. As shown in FIG. 3, the first internal electrode 41 extends to the first end surface 31 and is electrically connected to the first external terminal electrode 1. The second internal electrode 42 extends to the second end surface 32 and is electrically connected to the second external terminal electrode 2.

As shown in FIG. 4, the first external terminal electrode 1 (second external terminal electrode 2) includes a substrate plating film 1a (2a) defined by a Cu plating film, a first upper plating film 1b (2b) defined by a Ni plating film, and a second upper plating film 1c (2c) defined by a Sn plating film.

In FIG. 4, a connection portion between the first external terminal electrode 1 disposed on the first end surface of the capacitor main body 10 and the first internal electrode 41 is shown. On the other hand, a connection portion between the second external terminal electrode 2 (refer to FIGS. 1 and 2) and the second internal electrode 42 and the connection portion shown in FIG. 4 are mirror images of each other. Therefore, the substrate plating film 2a, the first upper plating film 2b, the second upper plating film 2c, and the second internal electrode defining the second external terminal electrode 2 are shown in parentheses.

As shown in FIG. 4, the external terminal electrode 1 (2) of the laminated ceramic capacitor of the first preferred embodiment preferably has a three-layer structure including the substrate plating film 1a (2a), the first upper plating film 1b (2b), and the second upper plating film 1c (2c), for example.

The average particle diameter of metal particles defining the substrate plating film 1a (2a) preferably is at least about 1.0 µm, for example.

In the first preferred embodiment, the substrate plating film 1a (2a) is made of a Cu strike plating film provided directly on the end surface 31 (32) of the capacitor main body 10 and a thick Cu plating film disposed thereon. However, the substrate plating film 1a (2a) can preferably be disposed directly on the end surface of the capacitor main body 10 not provided with the Cu strike plating film, or may preferably include only the Cu strike plating film.

Preferably, the substrate plating film and the upper plating film are formed from, for example, a plating film of one type of metal selected from the group consisting of Cu, Ni, Sn, Pb, Au, Ag, Pd, Bi, and Zn or an alloy containing the above-described metal.

In the laminated ceramic capacitor of the first preferred embodiment, the substrate plating film 1a (2a) defined by a Cu plating film ensures the sealing performance so as to prevent intrusion of moisture and other contaminants from the outside.

The first upper plating film 1b (2b) defined by the Ni plating film provides the solder-barrier function.

Furthermore, the second upper plating film 1c (2c) defined by the Sn plating film provides the function of ensuring wettability.

In preferred embodiments of the present invention, the material for the plating film defining the outermost layer of the upper plating film (in the first preferred embodiment, the second upper plating film 1c (2c)) is selected in accordance with a mounting arrangement. For example, when a product is mounted using wire bonding, Au can preferably be used, and a product is embedded in a substrate, Cu can preferably be used.

The preferable materials and thicknesses of the dielectric layers defining the laminated ceramic capacitor, the first and the second internal electrodes defining internal conductors, and the external terminal electrodes will be described below.

Dielectric Layer

For the material defining the dielectric layer, a dielectric ceramic including, for example, $BaTiO_3$, $CaTiO_3$, $SrTiO_3$, and $CaZrO_3$, as a primary component can preferably be used. Alternatively, materials in which secondary components, e.g., Mn compounds, Fe compounds, Cr compounds, Co compounds, and Ni compounds, for example, are added to these primary components may preferably be used.

It is preferable that the thickness of the dielectric layer after firing is about 1 µm to about 10 µm.

Internal Electrode

For the material defining the internal electrode, for example, Ni, Cu, Ag, Pd, Ag—Pd alloys, and Au can preferably be used.

It is preferable that the thickness of the internal electrode after firing is about 0.5 µm to about 2.0 µm, for example.

External Terminal Electrode

Preferably, the substrate plating film defining the external terminal electrode is a plating film made of a metal selected from the group consisting of Cu, Ni, Sn, Pb, Au, Ag, Pd. Bi, and Zn or an alloy including the metal, for example.

It is preferable that the thickness of the substrate plating film after firing is about 1 µm to about 10 µm, for example.

For the material of the upper plating film defining the external terminal electrode, an appropriate metal material is selected in accordance with the mounting arrangement.

For example, when the laminated ceramic electronic component is mounted using soldering, a material, for example, Ni, that is capable providing a solder barrier function and a material, for example, Sn, that is capable of providing excellent wettability are preferably used.

For example, when the laminated electronic component is mounted using wire bonding, Au is preferably used, and when the laminated electronic component is embedded in a substrate, Cu is preferably used.

A method for manufacturing the laminated ceramic capacitor of the first preferred embodiment will be described below.

(1) Ceramic green sheets and an electrically conductive paste for forming internal electrodes are prepared. The ceramic green sheets and the electrically conductive paste include a binder and a solvent, and organic binders and organic solvents in the related art can preferably be appropriately selected and used.

(2) The electrically conductive paste is printed in predetermined patterns on the ceramic green sheets by, for example, screen printing so as to form internal electrode patterns.

(3) Individual ceramic green sheets are laminated in a predetermined order such that a predetermined number of ceramic green sheets with printed internal electrode patterns are laminated, and a predetermined number of outer layer ceramic green sheets with no printed internal electrode pattern nor internal conductor pattern are laminated on the top and the bottom thereof so as to provide a mother laminate. If necessary, the mother laminate is press-bonded in a lamination direction by an isostatic press or other suitable method.

(4) An unfired mother laminate is cut into a predetermined size so that an unfired capacitor main body is produced.

(5) The resulting unfired capacitor main body is fired. The firing temperature depends on the type of ceramic defining the ceramic green sheet and the material used for the internal electrode. Usually, it is preferable that the firing is conducted at about 900° C. to about 1,300° C., for example.

(6) If necessary, a polishing treatment, e.g., barrel finishing, is performed on the exposed portion of the internal electrode. At this time, chamfering is also performed so as to round the ridge and the corner portion of the capacitor main body. Furthermore, if necessary, water repellent finishing is performed and, thereby, a pretreatment to prevent the intrusion of the plating solution in gaps between the exposed portion of the internal electrode and the dielectric layer is performed.

(7) The capacitor main body is subjected to a plating treatment, so that, as shown in FIG. 4, metal particles are deposited on the exposed portions of the first internal electrodes 41 and the second internal electrodes 42 and, thereby, the substrate plating films 1a and 2a are formed.

When the first surface conductors 13 and the second surface conductors 14 (refer to FIG. 2) are formed, the surface conductor patterns may be printed on the outermost ceramic green sheets in advance and co-firing may be performed together with the ceramic element assembly. Alternatively, the surface conductors may be printed on the principal surfaces of the ceramic element assembly after firing and, thereafter, baking may be performed.

For the formation of the substrate plating films 1a and 2a, Cu strike plating films are formed directly on the end surfaces of the capacitor main body 10, and thick Cu plating is performed thereon by Cu electroplating so as to form the substrate plating films 1a and 2a. At this time, the average particle diameters of Cu particles of the thick Cu plating films, which are the main bodies of the substrate plating films 1a and 2a, are preferably set to be at least about 1.0 μm, for example.

Here, after the Cu strike plating film is formed, the thick Cu plating is applied thereto and, thereby, the substrate plating film 1a or 2a is formed. However, in some cases, the substrate plating film can be formed by applying the thick Cu plating to the end surface of the capacitor main body without forming the Cu strike plating film.

Furthermore, in some cases, the substrate plating films 1a and 2a can be formed of only the Cu strike plating films.

Intrusion of moisture into the capacitor main body can be reliably prevented or prevented preferably by specifying the average particle diameter of the Cu particles defining the substrate plating film (thick Cu plating film) to be at least about 1.0 μm, for example, as in the first preferred embodiment.

The average particle diameter of the Cu particles defining the above-described Cu strike plating film is not specifically limited. However, the average particle diameter of the Cu strike plating film may preferably be set to at least about 1.0 μm and, thereby, the average particle diameter of the Cu particles in the entire substrate plating film may preferably be set to at least about 1.0 μm.

(8) Subsequently, Ni electroplating and Sn electroplating are further performed, so that the first upper plating layer 1b (2b) defined by the Ni plating film and the second upper plating layer 1c (2c) defined by the Sn plating film are formed.

In this manner, the laminated ceramic capacitor shown in FIG. 1 and FIG. 2 can be obtained. As for the plating, either electroplating or electroless plating may be used. However, usually, it is preferable that the electroplating is used because in the case in which an increase in plating deposition rate is desired in the electroless plating, a pretreatment with a catalyst is required and, therefore, the process becomes complicated.

Furthermore, as for the plating method, for example, it is preferable that barrel plating, in which the capacitor main body is disposed in a barrel and plating is performed while the barrel is rotated, is used, although other methods can also be used.

Second Preferred Embodiment

Figure 5:
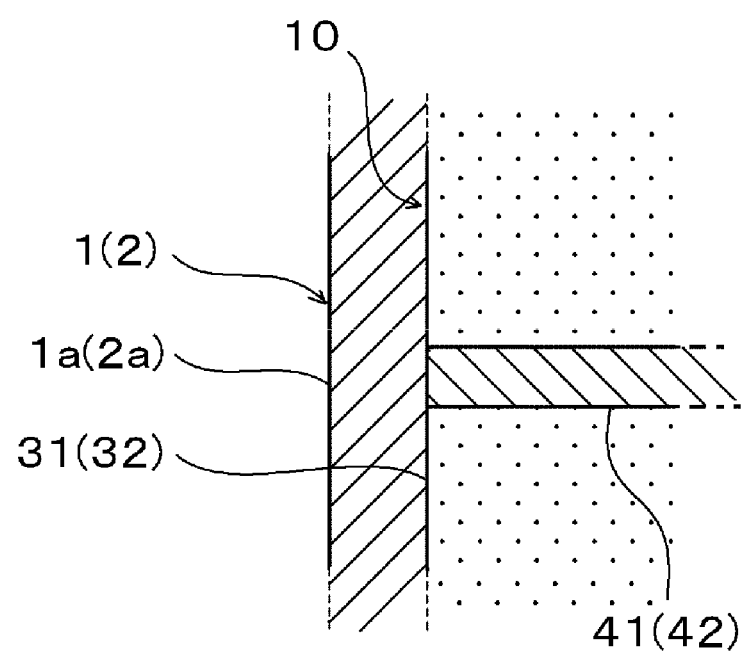
FIG. 5 is a diagram showing a magnified portion of a laminated ceramic capacitor according to a second preferred embodiment of the present invention.

FIG. 5 is a diagram showing a magnified portion of a laminated ceramic capacitor according to a second preferred embodiment of the present invention. The configurations and materials of the laminated ceramic capacitor according to the second preferred embodiment are substantially the same as those in the laminated ceramic capacitor according to the first preferred embodiment except that the first (and the second) external terminal electrode 1 (2) includes only the substrate plating film 1a (2a).

FIG. 5 shows a connection portion between the first external terminal electrode 1 disposed on the first end surface 31 of the capacitor main body 10 and the first internal electrode 41. On the other hand, a connection portion between the second external terminal electrode 2 (refer to FIGS. 1 and 2) and the second internal electrodes 42 and the connection portion shown in FIG. 5 are mirror images of each other. Therefore, the substrate plating film 2a and the second internal electrode 42 defining the second external terminal electrode 2 are shown in parentheses.

The laminated ceramic capacitor according to the second preferred embodiment can be produced by a method similar to the method for manufacturing the laminated ceramic capacitor according to the first preferred embodiment.

However, in the step of forming the external terminal electrode, the step of forming the upper plating film on the substrate plating film is omitted.

Third Preferred Embodiment

Figure 6:
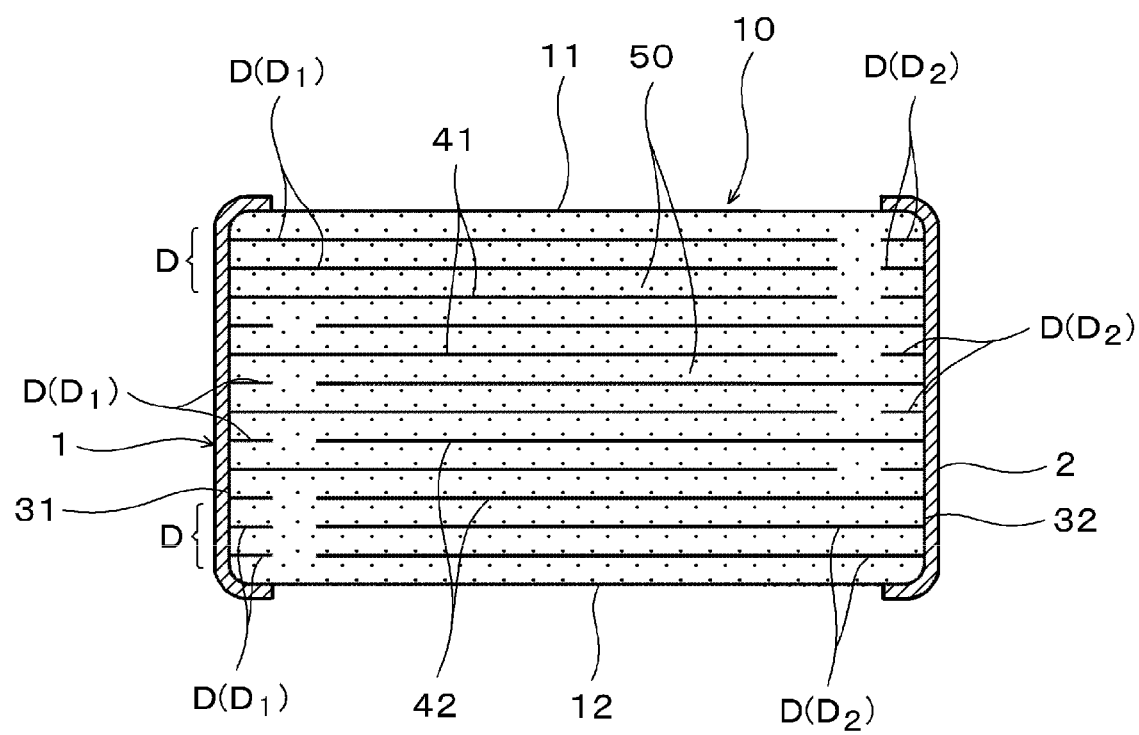
FIG. 6 is a sectional view showing a configuration of a laminated ceramic capacitor according to a third preferred embodiment of the present invention.

FIG. 6 is a diagram showing a laminated ceramic capacitor according to a third preferred embodiment of the present invention. The laminated ceramic capacitor according to the third preferred embodiment has substantially the same configuration as that of the laminated ceramic capacitor according to the first embodiment except that the capacitor main body 10 includes dummy internal electrodes D ($D_1$, $D_2$). In FIG. 6, the same portions as or the portions corresponding to those shown in FIG. 2 are indicated by the same reference numerals as those set forth above.

For dummy electrodes D in the laminated ceramic capacitor, first dummy internal electrodes $D_1$ that extend to the first end surface 31 and second dummy internal electrodes $D_2$ that extend to the second end surface 32 are provided. The first dummy electrodes $D_1$ and the second dummy electrodes $D_2$ are disposed on the same or substantially the same planes as those on which the individual internal electrodes 41 and 42 between the dielectric layers 50 are disposed, and are also disposed in outer layer portions, in which no internal electrode is disposed, outside the region in which the internal electrodes are disposed in a lamination direction.

The laminated ceramic capacitor according to the third preferred embodiment can also be produced by a method similar to the method for manufacturing the laminated ceramic capacitor according to the first preferred embodiment.

In the case in which the laminated ceramic capacitor according to the third preferred embodiment is produced, ceramic green sheets defining functional layer portions which are provided with internal electrode patterns and dummy internal electrode patterns and ceramic green sheets defining outer layer portions which are provided with only dummy internal electrode patterns are prepared as required, and are laminated in a predetermined order. It is also possible that ceramic green sheets provided with neither internal electrode pattern nor dummy internal electrode pattern are provided.

Fourth Preferred Embodiment

Figure 7:
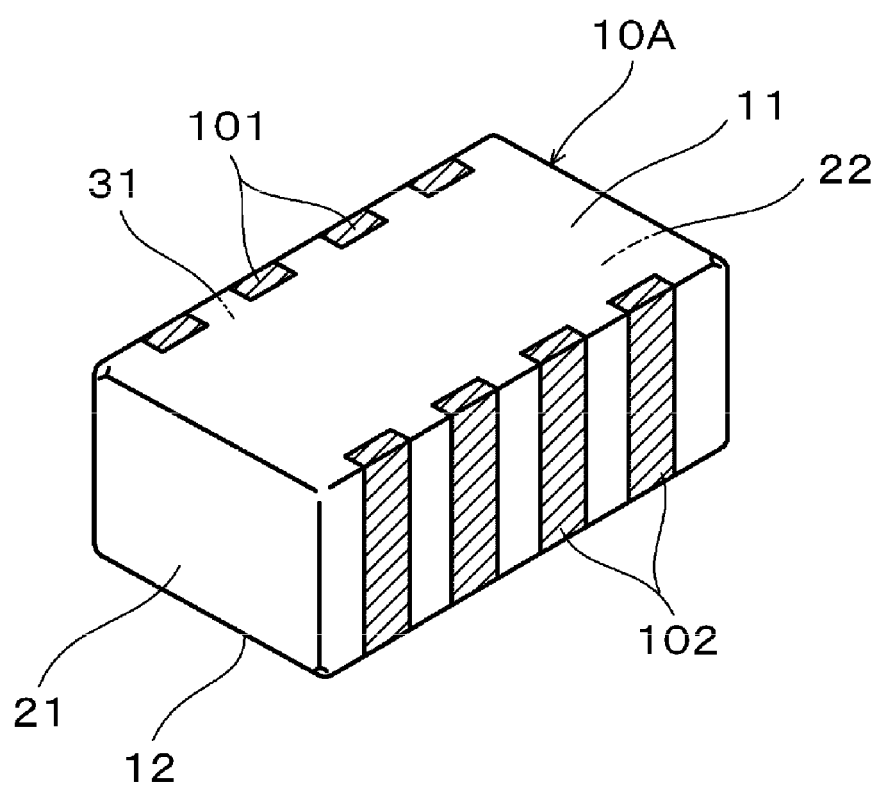
FIG. 7 is a perspective view showing an external configuration of an array type laminated ceramic capacitor (capacitor array) according to a fourth preferred embodiment of the present invention.
Figure 8:
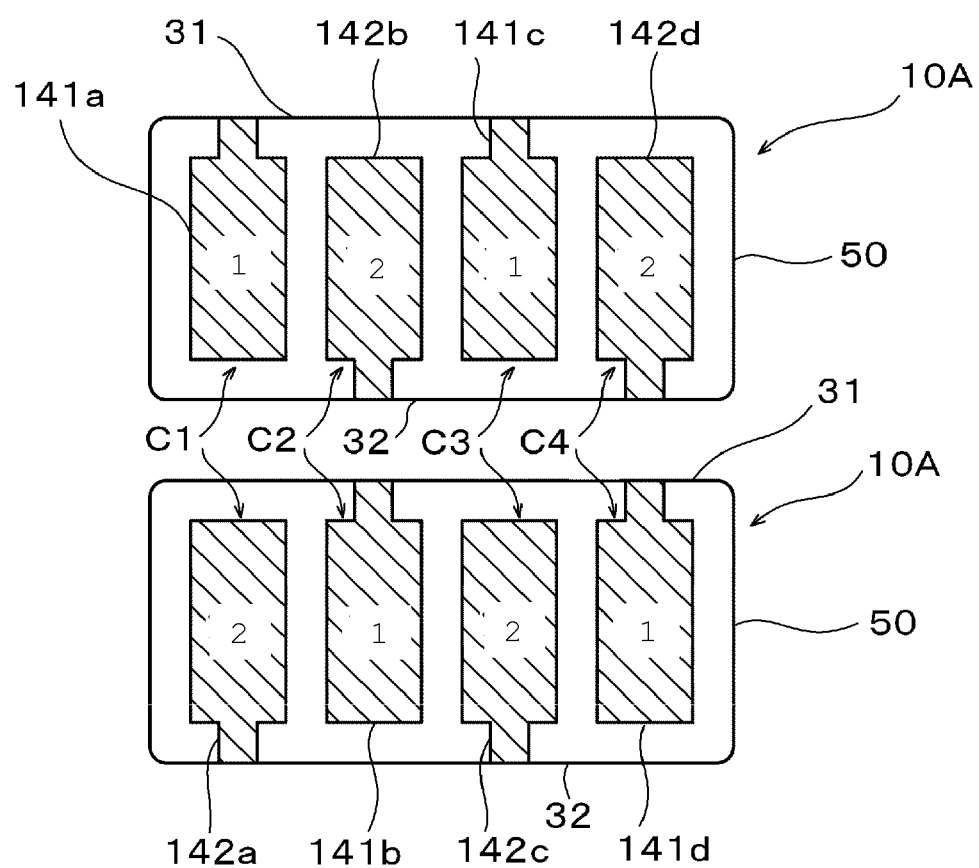
FIG. 8 is a diagram showing an arrangement pattern of a plurality of internal electrodes in the array type laminated ceramic capacitor according to the fourth preferred embodiment of the present invention.

FIG. 7 is a diagram showing an array type laminated ceramic capacitor (capacitor array) according to a fourth preferred embodiment of the present invention. FIG. 8 is a diagram showing an arrangement pattern of internal electrodes. As shown in FIG. 7, the array type laminated ceramic capacitor according to the fourth preferred embodiment includes a capacitor array main body 10A substantially in the shape of a rectangular parallelepiped having a first principal surface 11 and a second principal surface 12 opposite thereto, a first side surface 21 and a second side surface 22 opposite to thereto, and a first end surface 31 and a second end surface 32 opposite thereto.

A plurality of first external terminal electrodes 101 is disposed on the first end surface 31 of the capacitor array main body 10A, and a plurality of second external terminal electrode 102 is disposed on the second end surface 32. The first external terminal electrodes 101 and the second external terminal electrodes 102 are electrically insulated from each other.

As shown in FIG. 8, a plurality of first internal electrodes 141*a*, 141*b*, 141*c*, and 141*d* and a plurality of second internal electrodes 142*a*, 142*b*, 142*c*, and 142*d* are provided with dielectric layers 50 therebetween in the capacitor array main body 10A. That is, with respect to one plane, the first internal electrodes 141*a*, 141*b*, 141*c*, and 141*d* and the second internal electrodes 142*a*, 142*b*, 142*c*, and 142*d* are alternately arranged along a longitudinal direction of the capacitor array main body 10A, and with respect to the lamination direction, the first internal electrodes 141 and the second internal electrodes 142 are arranged so as to be opposed to each other with dielectric layers 50 therebetween. Furthermore, as shown in FIG. 8, the individual first internal electrodes 141*a*, 141*b*, 141*c*, and 141*d* extend to the first end surface 31 and are electrically connected to the first external terminal electrode 101. The second internal electrodes 142*a*, 142*b*, 142*c*, and 142*d* extend to the second end surface 32 and are electrically connected to the second external terminal electrode 102.

In this array type laminated ceramic capacitor according to the fourth preferred embodiment, four capacitor portions C1, C2, C3, and C4 defined by opposing the individual first internal electrodes 141 to the individual second internal electrodes 142 with the dielectric layers 50 therebetween are disposed along the longitudinal direction of the capacitor array main body 10A.

In this array type laminated ceramic capacitor according to the fourth preferred embodiment, the individual external terminal electrodes have the same or substantially the same configurations as those in the first preferred embodiment and are provided with a substrate plating film and an upper plating film including a first upper plating film defined by a Ni plating film and a second upper plating film defined by a Sn plating film.

The laminated ceramic capacitor according to the fourth preferred embodiment can also be produced by a method similar to the method for manufacturing the laminated ceramic capacitor according to the first preferred embodiment. However, it is necessary that, for example, ceramic green sheets provided with internal electrode patterns in accordance with the shape of the internal electrodes are used and the external terminal electrodes are arranged on outer surfaces of the capacitor array main body so as to cover individual exposed portions of the individual internal electrodes.

Fifth Preferred Embodiment

Figure 9:
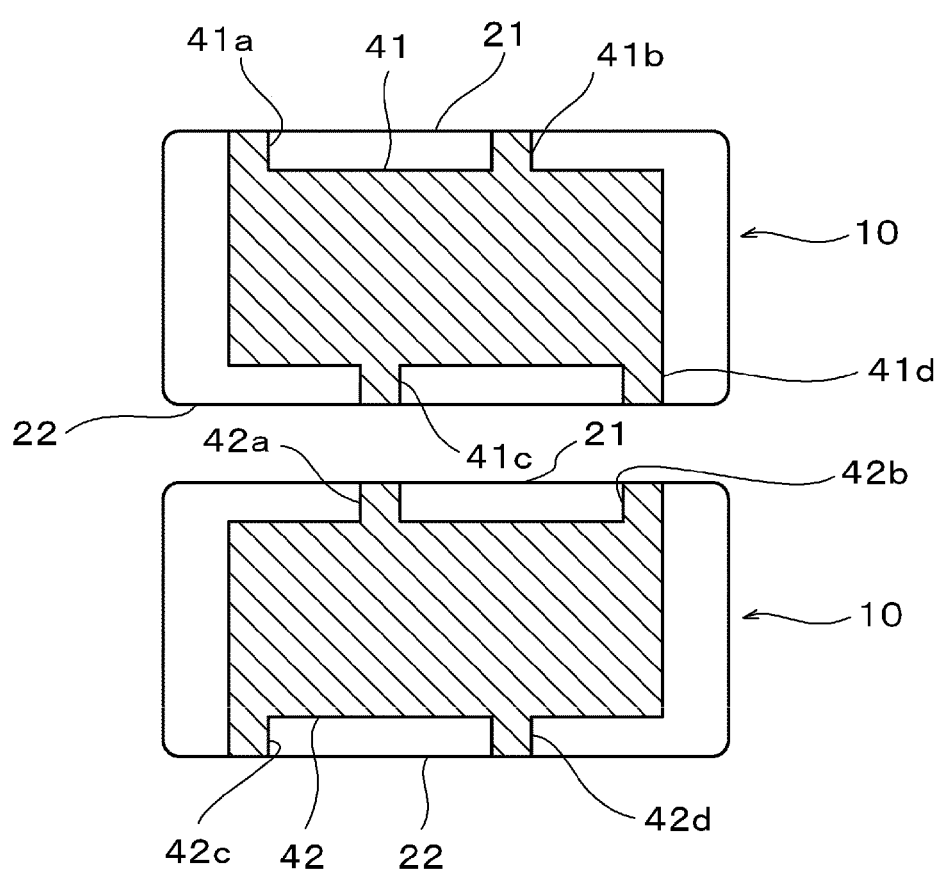
FIG. 9 is a diagram showing a multiterminal type low ESL laminated ceramic capacitor according to a fifth preferred embodiment of the present invention.

FIG. 9 is a diagram showing internal electrode patterns of a multiterminal type low ESL laminated ceramic capacitor according to a fifth preferred embodiment of the present invention.

In the laminated ceramic capacitor according to the fifth preferred embodiment, a first internal electrode 41 has a plurality of lead portions 41*a*, 41*b*, 41*c*, and 41*d*, and a second internal electrode 42 has a plurality of (in the fifth preferred embodiment, four) lead portions 42*a*, 42*b*, 42*c*, and 42*d*. In the fifth preferred embodiment, preferably, the first internal electrode 41 includes four lead portions and the second internal electrode 42 includes four lead portions, for example.

As shown in FIG. 9, in each of a first side surface 21 and a second side surface 22, the lead portions 41*a*, 41*b*, 41*c*, and 41*d* of the first internal electrode 41 and the lead portions 42*a*, 42*b*, 42*c*, and 42*d* of the second internal electrode 42 are arranged so as to engage with each other, when viewed from above, (a) one lead portion 41*b* of the first internal electrode 41 is arranged between the lead portions 42*a* and 42*b* of the second internal electrode 42, (b) another lead portion 41*c* of the first internal electrode 41 is arranged between the lead portions 42*c* and 42*d* of the second internal electrode 42, (c) one lead portion 42*a* of the second internal electrode 42 is arranged between the lead portions 41*a* and 41*b* of the first internal electrode 41, and (d) another lead portion 42*d* of the second internal electrode 42 is arranged between the lead portions 41*c* and 41*d* of the first internal electrode 41.

In the laminated ceramic capacitor according to the fifth preferred embodiment, although not specifically shown in FIG. 9, the external terminal electrodes are configured to cover the lead portions (exposed portions) of the first and the second internal electrodes, the lead portions being exposed at the side surfaces of the capacitor main body.

In the laminated ceramic capacitor according to the fifth preferred embodiment, the external terminal electrodes may preferably have a configuration similar to that in the first preferred embodiment. The laminated ceramic capacitor can also be produced by a method similar to the method for manufacturing the laminated ceramic capacitor according to the first preferred embodiment. However, it is necessary that, for example, ceramic green sheets provided with internal electrode patterns arranged in accordance with the shape of the internal electrodes are used and the external terminal electrodes are arranged on the side surfaces of the capacitor main body so as to cover the individual exposed portions of the individual internal electrodes.

EXAMPLE 1

Preferred embodiments of the present invention will be more specifically described below with reference to examples.

A laminated ceramic capacitor having the following configuration was prepared by a method similar to the method for manufacturing the laminated ceramic capacitor according to the first preferred embodiment.

1) Dimensions:
Length: L=2.0 mm,
Width: W=1.25 mm,
Height: T=1.25 mm
2) Constituent material for dielectric layer: barium titanate based dielectric ceramic
3) Constituent material for internal electrode: primary component: Ni
4) The number of lamination: 416 layers (thickness of dielectric layer: 1.9 μm)
5) Rated voltage: 6.3 V
6) Capacitance: 10 μF In this regard, external terminal electrodes provided with the following substrate plating film and the upper plating film were formed by performing direct plating on a capacitor main body, as described below.

Configuration of External Terminal Electrode
(a) Substrate Plating Film
A Cu strike plating film and a thick Cu plating film formed by Cu electroplating thereon are included. The desired thickness of the substrate plating film is about 10 μm.
(b) Upper Plating Film
A first upper plating film which is disposed on the substrate plating film and which is formed by Ni electroplating and a second upper plating film which is disposed on the first upper plating film and which is formed by Sn electroplating are included.

The preferred thickness of the first upper plating film is about 4 μm, and the preferred thickness of the second upper plating film is also about 4 μm.

The formation of the external terminal electrode will be described below in detail.

Plating Bath
(1) Plating Bath Used for Forming Substrate Plating Film
(a) A plating bath under the following condition was used for forming the Cu strike plating film constituting the substrate plating film.
Copper pyrophosphate: 14 g/L,
Pyrophosphoric acid: 120 g/L
Potassium oxalate: 10 g/L
pH: 8.6
Temperature: 25° C.
(b) A plating bath under the following condition was used for forming the thick Cu plating film constituting the substrate plating film.
Component of plating bath: PYROBRIGHT PROCESS produced by C.Uyemura & Co., Ltd.
pH: 8.6
Temperature: 55° C.
The amount of 28% aqueous ammonia that was added to the plating bath was changed as described below and, thereby, Cu plating films having different average particle diameters of Cu particles defining the substrate plating film were formed.
Sample 1 (comparative example): 2.0 ml/L
Sample 2 (comparative example): 1.5 ml/L
Sample 3 (example): 1.0 ml/L
Sample 4 (example): 0.5 ml/L
Sample 5 (example): 0.0 ml/L
(2) Plating Bath for Forming First Upper Plating Film (Ni Plating Film)
(a) For a plating bath for forming the first upper plating film, a nickel plating bath (Watts bath) including nickel sulfate, nickel chloride, and boric acid as primary components (weakly acidic simple Ni bath) was used.
pH: 4.2
Temperature: 60° C.
(3) Plating Bath for Forming Second Upper Plating Film (Sn Plating Film)
For a plating bath for forming the second upper plating film, the following plating bath was used.
Component of plating bath: Sn-235 produced by Dipsol Chemicals Co., Ltd.
pH: 5.0
Temperature: 33° C.
Plating method, plating condition, and the like
Plating method: horizontally rotational barrel plating
The number of revolution of barrel: 10 rpm
Electrically conductive media dimension: diameter 1.8 mm (electrically conductive media)
Current density×time
Cu strike plating: 0.11 A/dm$^2$×60 min
(Thick) Cu plating: 0.30 A/dm$^2$×60 min
Ni plating: 0.20 A/dm$^2$×60 min
Sn plating: 0.10 A/dm$^2$×60 min In this example, individual plating films are formed by an electroplating method, however, the method for forming a plating film is not specifically limited. It is also possible to form plating films, for example, a Cu electroless plating film, a Ni—P electroless plating film, and a Ni—B electroless plating film) by an electroless plating method. However, when an internal electrode species does not have catalytic activity in the electroless plating, it is necessary that a catalyst activation treatment is performed.

Samples (laminated ceramic capacitors) 1 to 5 prepared as described above were subjected to a high-temperature and high-humidity test (PCBT) so as to examine the reliability of individual Samples.

The PCBT was performed under the condition of about 125° C./95% RH/6.3 V (rated voltage)/72 hr, samples having insulation resistances reduced to about 1 MΩ or less were counted as defective samples, and a fraction of defective samples was calculated based on the following equation.

fraction defective (%)=(the number of samples counted as defective samples/the total number of samples)×100

The results thereof are shown in Table 1.

TABLE 1

|  | Average particle diameter of Cu particles of substrate plating film (μm) | Fraction defective in PCBT (%)/(the number of defective samples/the number of samples) |
|---|---|---|
| Sample 1 (comparative example) | 0.5 | 45/(9/20) |
| Sample 2 (comparative example) | 0.7 | 25/(5/20) |

TABLE 1-continued

| | Average particle diameter of Cu particles of substrate plating film (μm) | Fraction defective in PCBT (%)/(the number of defective samples/the number of samples) |
|---|---|---|
| Sample 3 (example satisfying requirements of the invention) | 1.0 | 0/(0/20) |
| Sample 4 (example satisfying requirements of the invention) | 1.3 | 0/(0/20) |
| Sample 5 (example satisfying requirements of the invention) | 1.8 | 0/(0/20) |

As shown in Table 1, it was determined that with Sample 1 and Sample 2, which were comparative examples, many defective samples were produced during the test.

On the other hand, the laminated ceramic capacitors of Sample 3, Sample 4, and Sample 5, in which the average particle diameters of Cu particles of the substrate plating films were at least about 1.0 μm and, therefore, which satisfied the requirements of preferred embodiments of the present invention, deterioration of the moisture resistance at high temperatures was not observed. Thus, it was determined that high reliability in moisture resistance was obtained.

In the above-described examples, laminated ceramic capacitors are described. However, the present invention is not limited to the laminated ceramic capacitors according to the preferred embodiments of the present invention and can be applied to various laminated electronic components, e.g., laminated chip inductors and laminated chip thermistors, having structures in which internal conductors are disposed in the electronic component main body and external terminal electrodes are disposed on surfaces of the electronic component main body so as to connect to the internal conductors.

In the above-described examples, a case in which the material defining the electronic component main body is a dielectric ceramic is described. However, the material defining the electronic component main body is not limited to the dielectric ceramic and may be piezoelectric ceramic, semiconductor ceramic, and magnetic ceramic, for example. Furthermore, the material may include a resin.

The present invention is not limited to the above-described preferred embodiments and examples. Various applications and modifications can be made with respect to the materials of the internal conductor and the external terminal electrode, the method for forming the external terminal electrode, the material, the number of layers, and the forming method of the upper plating film defining the external terminal electrode within the scope of the present invention.

As described above, according to preferred embodiments of the present invention, the reliability in moisture resistance of the laminated electronic component provided with external terminal electrodes formed through direct plating can be improved. Consequently, preferred embodiments of the present invention can be used for various laminated electronic components having structures in which internal conductors are disposed in the electronic component main body and external terminal electrodes are disposed through direct plating on surfaces of the electronic component main body in such a way as to connect to the internal conductors.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A laminated electronic component comprising:
   an electronic component main body including a plurality of laminated functional layers;
   internal conductors disposed inside the electronic component main body and including exposed portions exposed at outer surfaces of the electronic component main body; and
   external terminal electrodes disposed on the outer surfaces of the electronic component main body so as to connect to the internal conductors and to cover the exposed portions of the internal conductors; wherein
   the external terminal electrodes include a substrate plating film disposed directly on the outer surfaces of the electronic component main body so as to cover the exposed portions of the internal conductors;
   an average particle diameter of metal particles defining the substrate plating film is at least about 1.0 μm; and
   the metal particles defining the substrate plating film are Cu particles.

2. The laminated electronic component according to claim 1, wherein the external terminal electrodes further comprise at least one layer of an upper plating film disposed on the substrate plating film.

* * * * *